United States Patent
Jansma et al.

(10) Patent No.: US 9,234,128 B2
(45) Date of Patent: Jan. 12, 2016

(54) CHEMICAL BLEACHING FOR IMPROVED PERFORMANCE OF RECYCLED LAMP PHOSPHORS

(75) Inventors: Jon Bennett Jansma, Pepper Pike, OH (US); David James Monk, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 325 days.

(21) Appl. No.: 13/595,554

(22) Filed: Aug. 27, 2012

(65) Prior Publication Data

US 2014/0057517 A1    Feb. 27, 2014

(51) Int. Cl.
C09K 11/01    (2006.01)
C09K 11/00    (2006.01)

(52) U.S. Cl.
CPC .............. C09K 11/01 (2013.01); *Y02W 30/72* (2015.05)

(58) Field of Classification Search
CPC ........ C09K 11/01; C22B 7/002; C22B 7/006; C22B 7/008; H01J 9/52
USPC .......................................... 445/2, 23, 26, 61
See application file for complete search history.

(56) References Cited

U.S. PATENT DOCUMENTS

| | | | |
|---|---|---|---|
| 3,864,273 A | 2/1975 | Forbes et al. | |
| 5,160,663 A * | 11/1992 | Dutta | C09K 11/01 252/301.4 R |
| 5,418,005 A * | 5/1995 | Endo | C09K 11/01 427/140 |
| 5,723,170 A * | 3/1998 | Kawase | C03C 17/36 427/105 |
| 6,042,748 A | 3/2000 | Inoue et al. | |
| 6,869,327 B2 * | 3/2005 | Gyorgy | C09K 11/01 241/99 |
| 2002/0180339 A1 * | 12/2002 | Jansma | C03C 17/3411 313/486 |
| 2011/0206580 A1 | 8/2011 | Porob | |
| 2012/0152062 A1 | 6/2012 | Gourishankar et al. | |

FOREIGN PATENT DOCUMENTS

| | | |
|---|---|---|
| DE | 19617942 C1 | 6/1997 |
| DE | 19918793 A1 | 11/2000 |
| EP | 0338911 A1 | 10/1989 |
| EP | 0453685 A1 | 10/1991 |
| GB | 1333329 A | 10/1973 |
| GB | 2240109 A | 7/1991 |

OTHER PUBLICATIONS

PCT Search Report and Written Opinion dated Sep. 6, 2013 from corresponding Application No. PCT/US2013/052811.

* cited by examiner

*Primary Examiner* — Anh Mai
*Assistant Examiner* — Nathaniel Lee
(74) *Attorney, Agent, or Firm* — GE Global Patent Operation; Peter T. DiMauro

(57) ABSTRACT

A method is provided for removing organic impurities in the recycling of phosphors from fluorescent lamps. Particles created from the lamps are washed with a bleaching agent to decompose the organic materials. The organic materials are thereby solubilized and can be removed. The phosphors can then be recovered and reused to manufacture fluorescent lamps.

15 Claims, 3 Drawing Sheets

CHEMICAL BLEACHING FOR IMPROVED PERFORMANCE OF RECYCLED LAMP PHOSPHORS

FIELD OF THE INVENTION

The subject matter of the present disclosure relates generally to the use of bleaches to decompose organic materials in the recycling of phosphors from fluorescent lamps.

BACKGROUND OF THE INVENTION

Fluorescent lamps are typically constructed from a sealed glass tube that contains a small amount of mercury and an inert gas such as argon, xenon, neon, or krypton. Electrodes made of e.g., coiled tungsten are placed at different ends of the tube and are connected with an electrical circuit. When the mercury is properly vaporized within the lamp tube, applying a sufficient voltage difference across the electrodes will cause a current to flow through the gas in the tube thereby exciting the gas molecules and causing a release of photons—albeit in the form of short wave, ultraviolet light—a wavelength that does not provide the visible light that is desired.

The inside of the gas tube generally comprises a layer which includes phosphors—i.e. substances that can luminesce or give off light. More particularly, these phosphors are commonly applied as a paint-like coating to the inside of the tube. Organic solvents in the applied coating are allowed to evaporate leaving behind the phosphors. The tube may also be heated to remove residual solvent and fuse the coating to the lamp tube.

Photons released from the excited gas are absorbed by this coating of phosphors. In turn, the phosphors also emit photons but at a longer wave length than the photons released from the excited gas and, more importantly, at a wavelength that provides visible light. Variables such as the length of the glass tube determine how much visible light is provided by a particular lamp.

Advantageously, the fluorescent lamp converts the electrical energy supplied to its electrodes into a useful light more efficiently than a traditional incandescent lamp. In fact, much of the energy supplied to an incandescent lamp is lost in the form of heat. As a result, the fluorescent lamp is relatively less expensive to operate than an incandescent. Although the initial cost of a fluorescent is somewhat higher due to a ballast that is required in order to regulate the current, this cost is typically recovered in saved energy costs. Thus, the use of fluorescent lamps has become ubiquitous particularly in commercial applications.

For various reasons, after a period of use, fluorescent lamps eventually require replacement. By way of example, the electrodes may eventually fail, the small amount of mercury in the tube may absorb into the glass, the efficiency of the phosphors in absorbing and emitting photons may decrease, and other reasons may require replacement as well. As a result, a significant amount of fluorescent lamps must be disposed of each year.

The phosphors used in fluorescent lamps are typically rare earth compounds of various types. For example, europium-doped yttrium oxide (YEO) is widely used in fluorescent lamps as a red-emitting phosphor. Yttrium oxide that has been doped with other lanthanide series rare earth metals can also be used. A blend of phosphors, sometimes referred to as a triphosphor blend, is commonly used to provide white light from e.g., a red-emitting phosphor, a green-emitting phosphor, and a blue-emitting phosphor.

While the amount of phosphors used in producing an individual fluorescent lamp is relatively small, these phosphors are valuable materials. As such, recycling phosphors from discarded fluorescent lamps is desirable. Unfortunately, certain challenges are presented in attempting to reclaim these phosphor materials.

For example, the phosphors must be separated from multiple other materials that are used in the construction of the fluorescent lamps. These other materials can include glass used in constructing the tube, metals for the electrodes and other components, and plastics for parts such as a lamp base. In addition, certain organic materials may be present. These impurities may be introduced, for example, at some point between disposal of a spent lamp and recovery of the lamp from a waste disposal facility. The organic impurities can also result from the pyrolysis of a variety of materials during a mercury retorting heat treatment. Regardless, the organic impurities can discolor the phosphors causing them to exhibit e.g., a grey appearance and can also reduce the desired excitation by photons from the energized gas as discussed above.

One method for removing such organic impurities involves heating the recovered fluorescent lamp materials to a high temperature in the presence of a special atmosphere. Unfortunately, this process can be detrimental to some phosphors. Additionally, many of these organic materials may not be water soluble and, therefore, cannot be sufficiently removed by washing with water. Oxidizing acids or bases can be used but such can also result in phosphor damage and/or dissolution especially to yttrium europium oxide.

Accordingly, a process for the recycling of phosphors from fluorescent lamps would be useful. More particularly, a process for separating organic materials from the phosphors used in fluorescent lamps would be beneficial. Such a process that can be used with a variety of different phosphors and organic materials would also be particularly useful.

BRIEF DESCRIPTION OF THE INVENTION

The present invention relates to a method of removing organic impurities in the recycling of phosphors from fluorescent lamps. Particles created from the lamps are washed with a bleaching agent to decompose the organic materials. The organic materials are thereby solubilized and can be removed. The phosphors can then be recovered and reused to manufacture fluorescent lamps. Additional aspects and advantages of the invention will be set forth in part in the following description, or may be apparent from the description, or may be learned through practice of the invention.

In one exemplary aspect, the present invention provides a method for phosphor recycling. The method includes the steps of providing particles created from phosphor coated tubes of fluorescent lamps; preparing a mixture comprising water, the particles, and a bleaching agent; reacting the bleaching agent with organic materials present in the mixture; and separating one or more phosphors from the mixture.

In still another exemplary aspect, a method for recovering phosphors from fluorescent lamps is provided. The method includes creating particles from the fluorescent lamps; removing one or more metals from the particles; combining the particles into a mixture with water and a bleaching agent so as to decompose organic materials present in the particles; and recovering one or more phosphors from the mixture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
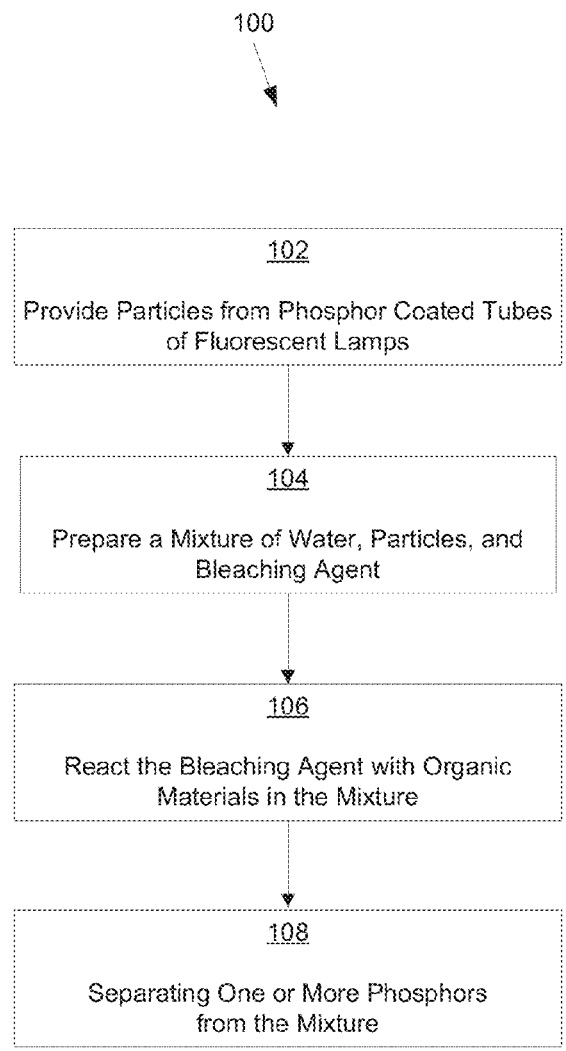
FIG. 1 illustrates an exemplary method of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a flowchart illustrating an exemplary method 100 of the present invention. In step 102, particles from phosphor coated tubes of fluorescent lamps are provided. By way of example, the particles can be provided as powders created by crushing spent fluorescent lamps collected from a recycling center. Separate collection containers can be provided at waste collection centers into which the spent fluorescent lamps are placed. These lamps can then be collected, treated to remove mercury, and converted into a powder that includes particles of phosphors, glass, basing cement, and metal impurities from the spent lamps and the equipment used to crush and separate them.

These particles can be screened or dry sifted to remove e.g., oversized or larger particles. For example, particles with at least one dimension larger than about 20 microns may be removed using a 520 mesh screen size. Magnetic components may be removed using magnetic separation technology well known in the art. One or more washes with water or water and a surfactant can be used to remove additional impurities—particularly those that are water soluble. Additional steps can also be applied to further remove unwanted materials from the particles as desired.

Next, in step 104, a mixture of the particles, water, and a bleaching agent are prepared. Substances that can be used as a bleaching agent may include one or more of a halogen-based bleaching compound (e.g., an alkali hypohalite such as sodium hypochlorite), peroxides (e.g., hydrogen peroxide), or others, such as ozone. Step 104 can be executed by several different approaches. For example, the mixture can be prepared by delivering the particles into water and providing agitation to disperse the particles and/or create a slurry. The bleaching agent can then be added. Alternatively, the particles can be added to a mixture of the bleaching agent and water.

In step 106, the bleaching agent reacts with the organic materials so as to decompose the same and render them water soluble. During this reacting step, the mixture can be continuously agitated. If necessary, the pH of the mixture can also be monitored and adjusted to minimize the amount of phosphor materials that are dissolved.

The amount of bleaching agent to add into the mixture can be determined by several methods. For example, a sample of the particles can be analyzed prior to the mixing step to determine the amount of organic materials present and, therefore, how much bleaching agent is needed. Alternatively, or in addition thereto, samples of the mixture can be taken after a certain amount of bleaching agent has been added to determine the amount of non-decomposed or unreacted organic materials that are still present. By way of further example, after allowing a sufficient reaction time, a sample of the mixture can also be taken to determine the amount of unreacted bleaching agent present.

Phosphors are removed from the mixture in step 108. Again, several techniques can be used to accomplish this removal. Where, for example, a batch type reactor is used, the un-dissolved phosphors will settle out. A centrifuge, for example, can be used to apply centrifugal forces to in increase the settling rate. The decomposed organic materials will be dissolved in the liquid of the mixture, which can be removed by e.g., decanting. Alternatively, or in addition thereto, a vacuum can be applied to remove liquid from the mixture. Other techniques may also be used to separate the phosphor solids from the dissolved and decomposed organic materials.

The phosphors can be washed by adding water (e.g., deionized water), allowing additional decomposed organic materials to dissolve as well as residual bleaching agent. The phosphor materials can again be removed by e.g., settling, decanting, centrifugal forces, vacuum separation, or the like. These washing steps can be repeated as necessary to remove most or all of the remaining decomposed organic materials.

The exemplary method 100 as described can be successfully used to remove phosphors such as e.g., yttrium-europium oxide (YEO); strontium, europium chlorapatite (SECA); barium, magnesium, aluminum, europium oxide (BAM); combinations thereof, and others as well. As will be understood by one of skill in the art, the present invention is not limited to the steps or order shown in FIG. 1 as method 100 and other variations and/or steps may also be used. The following examples are provided by way of explanation and illustration only and are not to be construed as limiting the invention.

EXAMPLE 1

Fluorescent lamp particles in the form of a powder were obtained using crush and sieve technology. More particularly, crush and sieve type lamp recycling involves crushing entire lamps and sifting out metals, glass, and powders from the crushed lamp product. The lamps that were processed were "end-of-life" or "spent" lamps and represented a mixture of many types, including many with low value halophosphor type phosphors.

The first step in evaluating the received powder samples was to further sift out oversize glass material, which was typically present at levels up to 70% by weight. Once this glass was substantially removed, the samples were washed with various mixtures of water and surfactants to remove dirt and debris. For the test shown in TABLE I below, 500 grams of washed phosphor was split into two lots. One lot was treated by mixing with sodium hypochlorite type bleach solution (Cell B) and the other was used as a control (Cell A) and was not treated with bleach. The bleach concentration in the bleached test cell was approximately 10% of the liquid weight.

Figure 2:
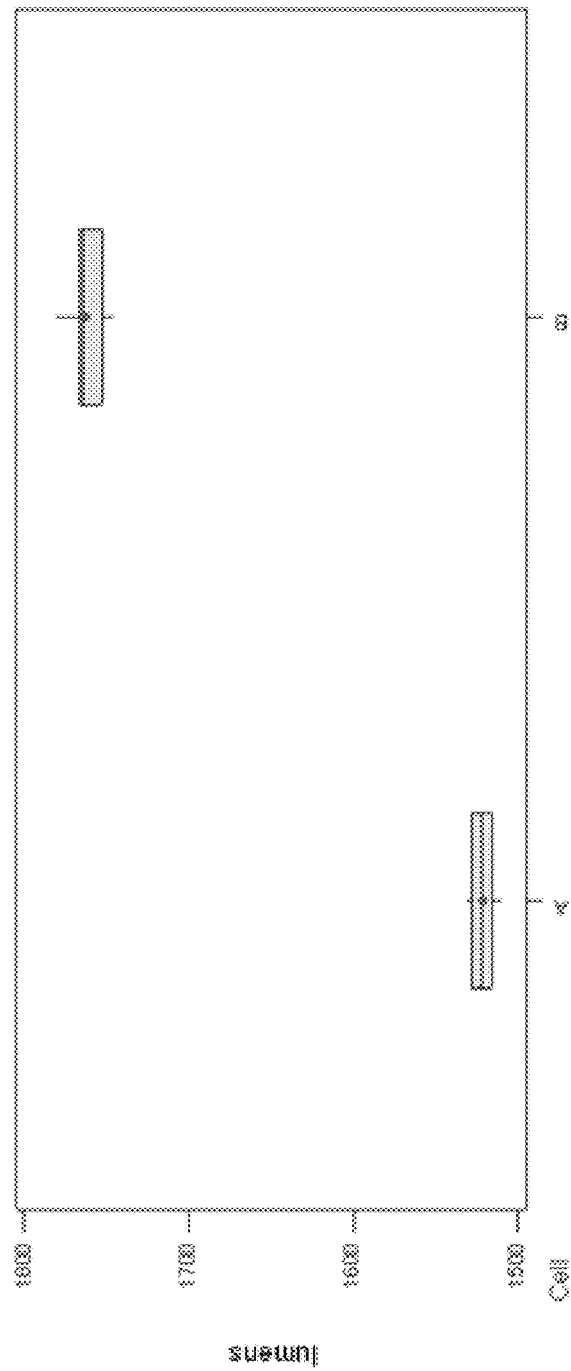
FIGS. 2 and 3 provide plots of certain experimental data as further described herein.

After bleaching, the bleached sample was visibly whiter. The bleach and reaction products (including decomposed organic materials) were removed by repeated washing and settling using deionized water. The resulting phosphor samples were reconstituted into a lamp coating by adding thickening polymers (polyethylene oxide), colloidal alumina for improved adhesion, and surfactants necessary for the lamp coating process. T8 type fluorescent lamp tubing was coated and made into F32T8 type fluorescent lamps at Bucyrus Lamp Plant, Bucyrus, Ohio. Photometric measurement results, after 100 hours of stabilization burning, are shown in the table below. One hundred hours were used as this is considered a standard initial burn time specified for fluorescent lamps to achieve stable readings. The tabulated data below are provided as averages for 8 lamps. FIG. 2 provides a plot of the data in the form of a "box" plot where the upper and lower sides of the boxes represent the 95% confidence interval for the data means.

TABLE I

| Cell | Base coat | Weight | ccx | ccy | CRI_Average | Lumens | Lamp LPW |
|---|---|---|---|---|---|---|---|
| A | Pdn 090 | 2.7 | 0.0403 | 0.4039 | 70.98 | 1521 | 46.95 |
| B | Pdn 090 | 2.7 | 0.3979 | 0.3975 | 71.65 | 1763 | 54.40 |

For this mixed phosphor sample from commercial spent lamp recycling, the bleaching process improves phosphor performance significantly. Approximately 20% improvement in performance can be seen and remains for further life testing photometry intervals. The results of this experiment indicate the unexpectedly good improvement in recycled phosphor processing provided by application of a chemical bleaching process, specifically treatment using sodium hypochlorite type bleach.

EXAMPLE 2

Fluorescent lamps discarded during the lamp manufacturing processes were utilized for this example. An end-cut process was applied that involves removing the lamp ends and blowing out the phosphor from the inside surface of the lamp tubing. The blown out phosphor was collected using a dust collecting type cyclone process. The resulting powder was collected and processed to remove mercury using a retort still. After retorting, the phosphors were subjected to washing.

About 5 kilograms of such phosphor containing powder was obtained and bleaching was performed for one cell in a manner similar to the test describe above with regard to EXAMPLE 1 using a 10% sodium hypochlorite bleach solution. After 24 hours of bleach exposure, the bleach was extracted by repeated mixing with deionized water and settling steps. Lamp coatings were formulated by adding the following ingredients to the washed phosphor samples as set forth below:
1. 500 grams phosphor basis (washed phosphor sample)
2. 500 grams polyethylene oxide solution (5% Polyox™ N3000) (Dow Chemical Company, Houston, Tex.)
3. 20 grams surfactant solution (10% Pluronics™ F108 (PEO-PPO copolymer type—nonionic) (BASF, Florham Park, N.J.)
4. 10 grams fumed alumina for adhesion (added as 12% water dispersion) made from Cabot Spetral™ 81 alumina (Cabot Corporation, Boston Mass.).
5. Water added to adjust coating weight to 2.7 grams per bulb (48 inch T8 glass bulbs)

Figure 3:
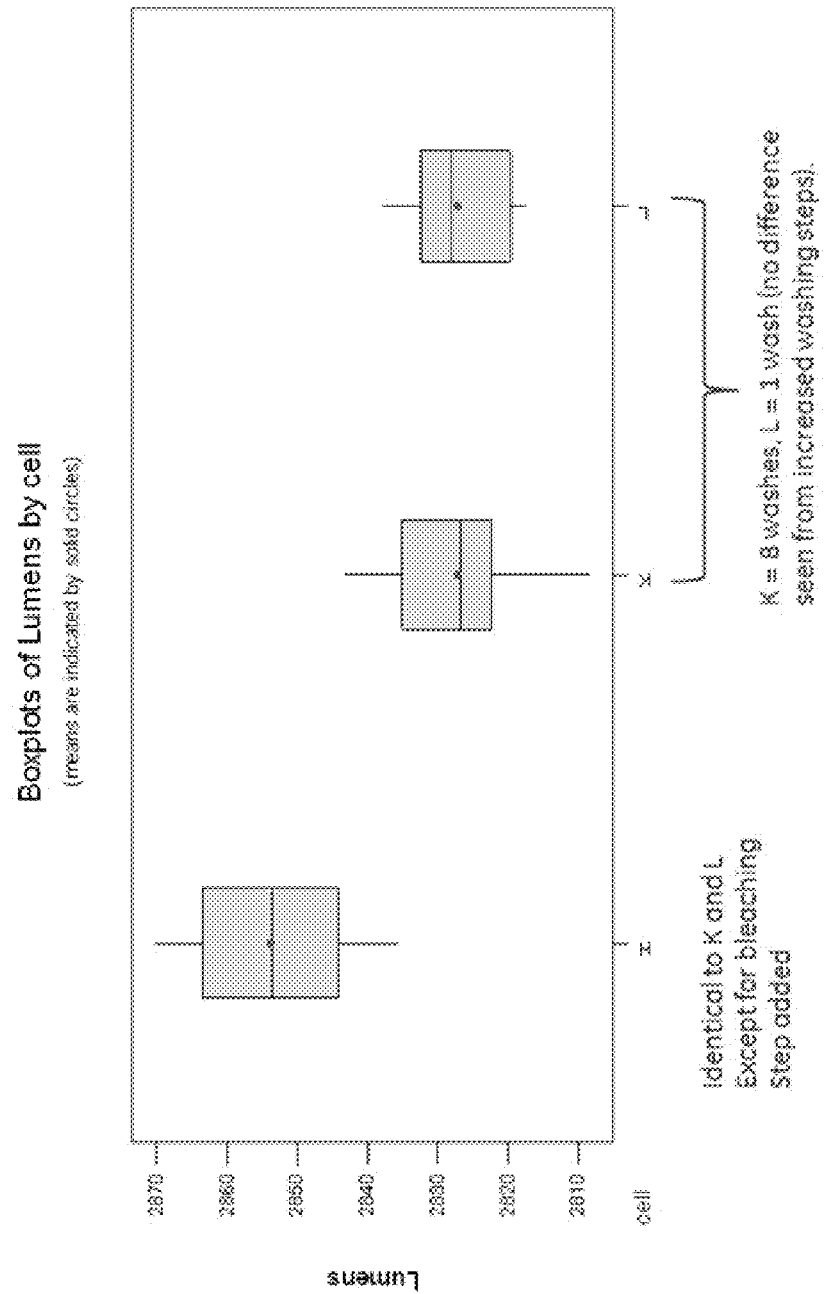

The above ingredients were well mixed, being careful not to introduce air bubbles, and coated onto 4' T8 bulbs. Lamps were made at GE Bucyrus Lamp Plant. FIG. 3 provides plotted results from photometric measurements made for these lamps using box plots for 8 lamp samples.

As with EXAMPLE 1, the bleached phosphor containing lamps indicated improved performance. The improvement shown for this test is only about 1%, but this is significant considering that the recycled phosphors used were from newly manufactured (i.e. unspent) lamps with the best possible separation processing.

Accordingly, the bleached phosphors reclaimed in a recycling process can be expected to perform as well as new, unused, phosphors. The fact that bleaching improves the performance in EXAMPLE 2 is an indicator that some contaminants are present even in new lamps. Thus, the bleaching process is advantageous even when recycling phosphors from new lamps. The possible use for bleaching treatments for coater wash and end-cleaning phosphor recycle streams can be considered based on these unexpected results.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for phosphor recycling, comprising:
   preparing a mixture comprising water, particles created from phosphor coated tubes of fluorescent lamps wherein the particles comprise at least YEO and BAM, and a bleaching agent;
   reacting the bleaching agent with organic materials present in the mixture; and
   separating phosphors comprising at least YEO and BAM from the mixture.
2. A method for phosphor recycling as in claim 1, wherein the bleaching agent comprises an alkali hypohalite.
3. A method for phosphor recycling as in claim 1, wherein the bleaching agent comprises a peroxide.
4. A method for phosphor recycling as in claim 1, further comprising the step of screening or sifting the particles to remove certain larger particles prior to said step of preparing a mixture.
5. A method for phosphor recycling as in claim 4, wherein said step of separating comprises:
   removing liquid containing decomposed organic materials from the mixture;
   adding water to the remaining phosphor materials to dissolve additional decomposed organic materials; and
   recovering phosphors from the water containing the decomposed organic materials.
6. A method for phosphor recycling as in claim 1, wherein particles created from phosphor coated tubes of fluorescent lamps have been provided by a step which comprises crushing phosphor coated tubes of fluorescent lamps into a powder.

7. A method for phosphor recycling as in claim 1, wherein said step of separating one or more of the phosphors from the mixture comprises applying centrifugal force to the mixture to settle the phosphors.

8. A method for phosphor recycling as in claim 1, wherein said step of separating one or more of the phosphors from the mixture comprises applying a vacuum to the mixture to remove liquid.

9. A method for phosphor recycling as in claim 1, further comprising the step of washing the particles with water prior to said step of preparing a mixture.

10. A method for phosphor recycling as in claim 1, further comprising the step of washing the particles with a surfactant and water prior to said step of preparing a mixture.

11. A method for phosphor recycling as in claim 1, wherein particles created from phosphor coated tubes of fluorescent lamps have been provided by steps comprising:

removing lamp ends from fluorescent lamps;

blowing phosphor from an inside surface of the fluorescent lamp; and collecting the phosphor.

12. A method for phosphor recycling as in claim 1, wherein the amount of bleaching agent used in said step of preparing the mixture is about 10 percent or less of the weight of the mixture.

13. A method for phosphor recycling as in claim 1, wherein the temperature of the mixture during said steps of preparing and reacting is about 25° C. or less.

14. A method for phosphor recycling as in claim 1, further comprising the step of manufacturing fluorescent lamps using phosphors provided by said step of separating.

15. A method comprising, coating lamp tubing with recycled phosphors comprising at least YEO and BAM;

wherein the recycled phosphors have been recycled by a process comprising:

preparing a mixture comprising water, a bleaching agent, and particles created from phosphor-coated tubes of fluorescent lamps wherein the particles comprise at least YEO and BAM;

reacting the bleaching agent with organic materials present in the mixture; and separating recycled phosphors comprising at least YEO and BAM from the mixture.

\* \* \* \* \*